Dec. 25, 1956
A. ANASTASIA
2,775,288
SAFETY BELT FOR VEHICLES
Filed April 15, 1955
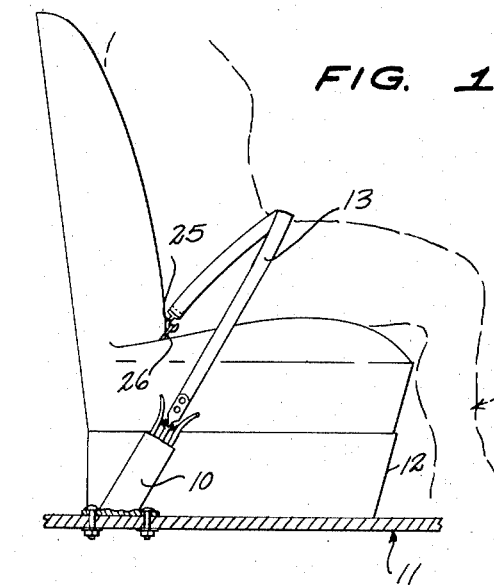
FIG. 1.
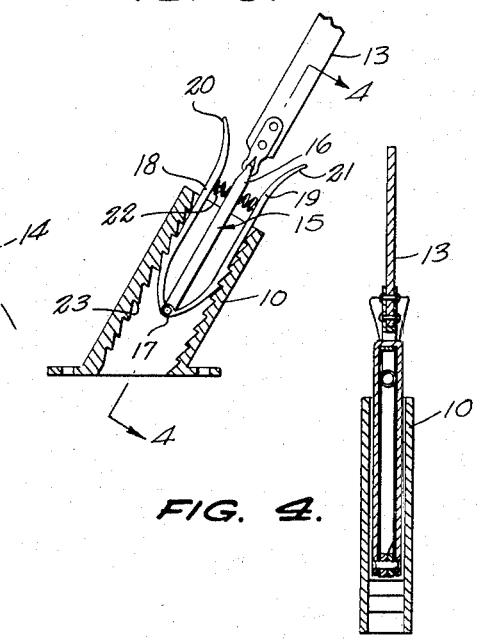
FIG. 3.
FIG. 4.
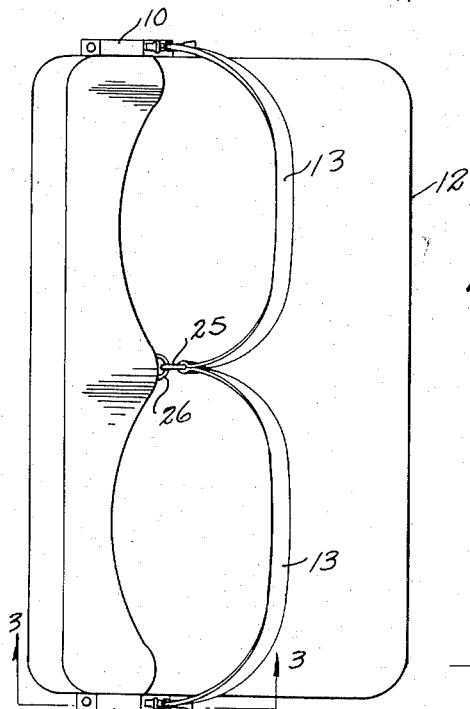
FIG. 2.
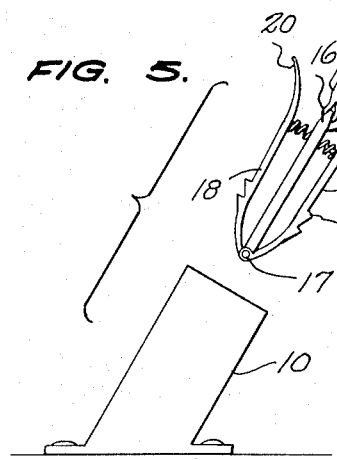
FIG. 5.
INVENTOR.
ANGELO ANASTASIA,
BY
McMorrow, Berman & Davidson
ATTORNEYS.

United States Patent Office 2,775,288
Patented Dec. 25, 1956

2,775,288

SAFETY BELT FOR VEHICLES

Angelo Anastasia, Monterey, Calif.

Application April 15, 1955, Serial No. 501,563

2 Claims. (Cl. 155—189)

The present invention relates to safety belts for holding passengers of vehicles against forwardly movement or movement to either side from the seats of the vehicle.

The primary object of the present invention is to provide a safety belt for a vehicle which is quickly attached and detached over the pelvic region of persons seated on the vehicle seat without the use of buckles, snaps, or hooks.

Another object of the present invention is to provide a safety belt for use in vehicles which has means for adjusting the tension of the strap encompassing the pelvic region of the persons on the vehicle seats.

A further object of the present invention is to provide a vehicle saftey belt which may be used to restrain movement forwardly or to either side of the seat of one, two or three passengers seated on the seat.

These and other objects and advantages of the present invention will be fully apparent from the following description when taken in connection with the annexed drawings, in which:

Figure 1 is a side view in elevation of a vehicle seat secured to the frame of a vehicle with the present invention installed thereon and showing in dotted lines a portion of a person seated upon the seat, Figure 2 is a top plan view of the seat of a vehicle showing the arrangement of the present invention, Figure 3 is a detailed view in cross-section on line 3—3 of Figure 2, Figure 4 is an end view in cross-section on line 4—4 of Figure 3, and Figure 5 is an exploded view of the components of the present invention detached from each other.

Referring in greater detail to the drawings in which like numerals indicate like parts throughout the several views, the invention is seen to consist of a safety belt for use in a vehicle and comprising a pair of upright hollow female members, each embodying a standard 10 having its lower end secured to the vehicle frame 11, one at each end of the vehicle seat 12 adjacent the rear edge of the seat 12 and slanting at an angle to the vertical forwardly of the seat 12.

A flexible strap 13 extends over the seat 12 at a spaced distance above the seat so as to embracingly engage the pelvic region of a person seated on the seat 12 to restrain movement forwardly or to either side of the person when the vehicle slows or stops, a person being shown in dotted lines as indicated by the reference numeral 14 in Figure 1.

Each end of the strap 13 is connected to the bight 16 of an inverted U-shaped member 15, the free ends of the legs of the member 15 with the converging ends of a pair of arms 18 and 19 being pivotally connected together by a pin 17. The arms 18 and 19 extend along opposite sides of the stem 15 and have their diverging ends formed as handles 20 and 21 to be grasped by the person on the seat to squeeze the arms together against the biasing action of the springs 22, one spring interposed between each arm 18 and 19 and the stem 15 intermediate the ends of the arms.

The complemental faces of the male and female members of the present invention have locking means embodying ratchet teeth 23 on the opposed inner walls of the standard 10 and similar teeth on the outer faces of the arms 18 and 19.

The strap 13 is provided intermediate its ends with a hook 25 engageable with a loop 26 secured to the seat 12 intermediate the ends of the latter. In use, one, two or three persons may be seated upon the seat within the vehicle and the strap 13 may be used to embracingly engage the pelvic region of the persons to restrain movement of the persons forwardly or to either side of the seat. The male members are instantly releasable from their position within the adjacent one of the female members by pressing the arms together and are as quickly insertable therewithin to adjust the strap over the pelvic region of the seated person or persons to any degree of tension desired.

When two persons are seated upon the seat, the hook 25 is engaged with the loop 26 to form a pair of embracing loops, as shown in Figure 2. The strap may also be used in this way when the seat is occupied by a single person, and when three persons are seated upon the seat, the hook 25 is left disengaged from the loop 26.

What is claimed is:

1. The combination with a vehicle frame and a seat supported upon the frame, of a safety belt comprising a hollow standard arranged at an angle with respect to the vertical secured to said vehicle frame at each end of the seat adjacent the rear edge thereof, a flexible strap extending over and spaced from said seat adapted to restrain movement forwardly or to either side of said seat of a person seated thereon, an inverted U-shaped member having the bight carried by each end of said strap and having the legs removably received in the adjacent standard, a pair of converging spring arms arranged one on each side of said member and having their converged ends pivotally connected to the free ends of the legs of said member for movement toward and away from each other, means urging said arms away from each other, and cooperating releasable locking means on the complemental faces of said standard and said arms releasably securing each of said members in the adjacent standard.

2. The combination with a vehicle frame and a seat supported upon the frame, of a safety belt comprising a hollow standard arranged at an angle with respect to the vertical and forwardly of said seat secured to said vehicle frame at each end of the seat adjacent the rear edge thereof, a flexible strap extending over and spaced from said seat adapted to restrain movement forwardly or to either side of said seat of a person seated thereon, a member carried by each end of said strap removably received in the adjacent standard, a pair of converging spring arms arranged one on each side of said member and having their converged ends pivotally connected to the other end of said member for movement toward and away from each other, spring means urging said arms away from each other, cooperating releasable locking means on the complemental faces of said standard and said arms releasably securing each of said members in the adjacent standard, and means releasably securing an intermediate portion of said strap of said seat intermediate the ends of the latter.

References Cited in the file of this patent

UNITED STATES PATENTS

| | | |
|---|---|---|
| 2,280.694 | Embree et al. | Apr. 21, 1942 |
| 2,365,626 | Carlisle | Dec. 19, 1944 |
| 2,468,560 | Kirkpatrick | Apr. 26, 1949 |
| 2,495,667 | Vizner | Jan. 24, 1950 |
| 2,583,224 | McDonald | Jan. 22, 1952 |
| 2,716,561 | Beran | Aug. 30, 1955 |

FOREIGN PATENTS

| | | |
|---|---|---|
| 15,983 | France | May 24, 1912 |
| 17,502 | Great Britain | 1909 |